United States Patent [19]
Naito et al.

[11] Patent Number: 5,162,708
[45] Date of Patent: Nov. 10, 1992

[54] METHOD AND DEVICE FOR DRIVING A SUPERSONIC MOTOR

[75] Inventors: Masafumi Naito, Toyohashi; Yoshihiro Adachi, Hamakita; Hironobu Kawai, Toyohashi, all of Japan

[73] Assignee: Asmo Co., Ltd, Kosai, Japan

[21] Appl. No.: 562,031

[22] Filed: Aug. 2, 1990

[30] Foreign Application Priority Data

Aug. 3, 1989 [JP] Japan ............................ 1-201756

[51] Int. Cl.⁵ .............................................. H01L 41/08
[52] U.S. Cl. ...................................... 318/116; 310/316
[58] Field of Search ............... 318/114, 116, 118, 138; 310/313 B, 316, 315, 317, 319, 323, 328, 318

[56] References Cited

U.S. PATENT DOCUMENTS

| | | | |
|---|---|---|---|
| 3,582,733 | 6/1971 | Brubaker | 318/116 |
| 3,619,757 | 11/1971 | Ioerger | 318/138 X |
| 4,056,761 | 11/1977 | Jacoby et al. | 318/116 |
| 4,249,100 | 2/1981 | Vasiliev et al. | 310/316 X |
| 4,403,176 | 9/1983 | Cranston | 318/114 |
| 4,445,063 | 4/1984 | Smith | 310/316 |
| 4,630,135 | 12/1986 | Sato | 310/313 B |
| 4,811,835 | 3/1989 | Bullivant et al. | 318/114 X |
| 4,868,445 | 9/1989 | Wand | 310/316 |
| 4,954,741 | 9/1990 | Furutsu et al. | 310/317 X |

FOREIGN PATENT DOCUMENTS 62-85684 4/1987 Japan .
62-92781 4/1987 Japan .
62-203575 9/1987 Japan .

Primary Examiner—A. Jonathan Wysocki

[57] ABSTRACT

A method for driving a supersonic motor includes the steps of driving the supersonic motor by supplying a driving voltage of greater frequency than a resonant frequency (point) to a driving piezoelectric electric element. The driving frequency is decreased when a wave form distortion is not generated in an output signal of an oscillation detection piezoelectric element provided in an elastic body. The driving frequency is increased when a wave form distortion is generated in the output signal of the oscillation detection piezoelectric element.

8 Claims, 16 Drawing Sheets

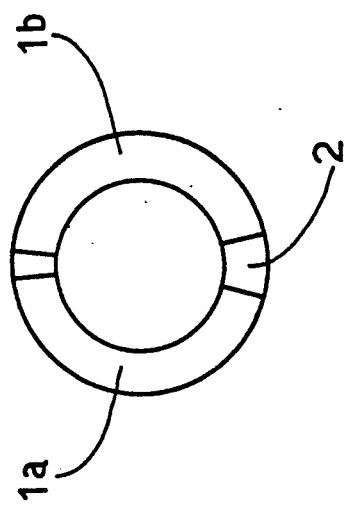

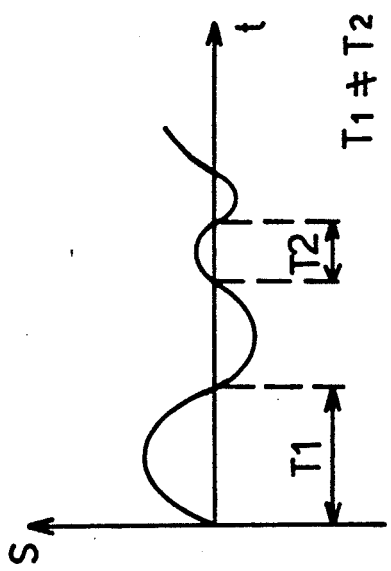
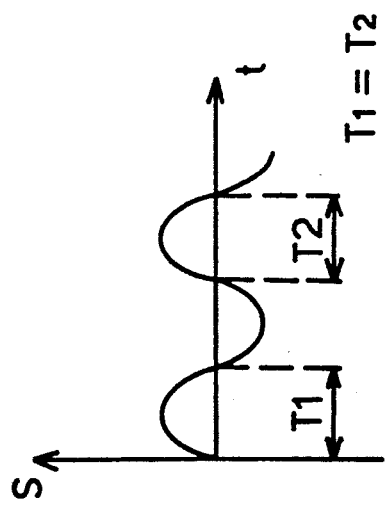

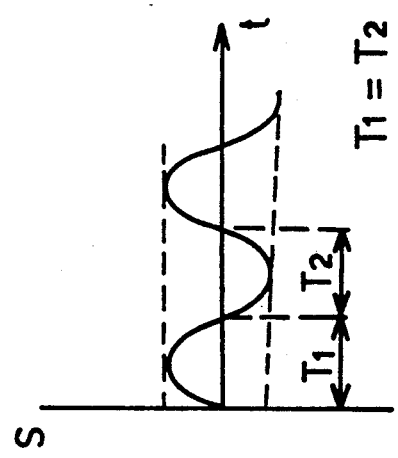
Fig.11(a)    $T_1 = T_2$
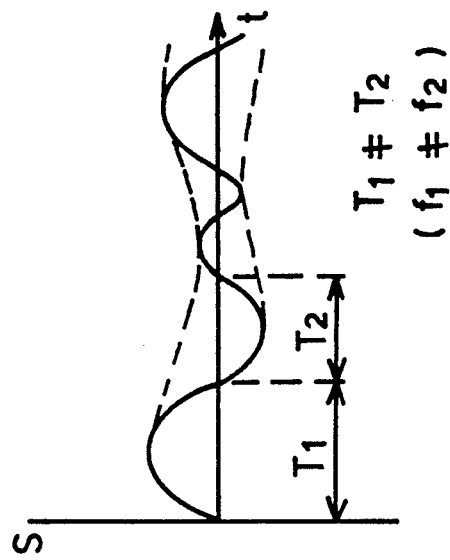
Fig.11(b)    $T_1 \neq T_2$
($f_1 \neq f_2$)

METHOD AND DEVICE FOR DRIVING A SUPERSONIC MOTOR

BACKGROUND OF THE INVENTION

The present invention relates to a method and a device for driving a supersonic motor.

Conventionally, a general method of driving a supersonic motor was to apply a signal of a resonant frequency of the supersonic motor to the supersonic motor (Japanese Patent Application No. 62-85684 and Japanese Patent Application No. 62-92781). Japanese Patent Application No. 62-85684 discloses a method of driving the supersonic motor, which comprises; providing monitor electrodes for detecting a driving condition of the supersonic motor in a piezoelectric element, detecting a phase difference between a monitor signal generating from the monitor electrodes and a driving frequency voltage applied to the piezoelectric element to drive the supersonic motor and determining a frequency of the frequency voltage so that the phase difference becomes a phase difference in a resonant condition of the supersonic motor.

Japanese Patent Application No. 62-92781 discloses a method of driving the supersonic motor near a resonant frequency of an elastic body, which comprises; dividing an output variable oscillator having the resonant frequency of the elastic body in a variable range into two, amplifying one output after it is shifted by 90° and applying the output to the piezoelectric element while amplifying the other output directly and applying the output to the piezoelectric element, comparing a voltage waveform phase and a current waveform phase of either of the two outputs, and adjusting the phase difference below a set level.

However, the prior art discussed above for example, created a problem. The problem is the supersonic motor generates an audible sound when the supersonic motor is driven in the resonant frequency.

Japanese Patent Application No. 62-203575 discloses a supersonic motor controlling an input power source frequency so that a monitor voltage becomes a constant voltage which is lower than a maximum monitor voltage obtained in the resonant frequency in a frequency range which is higher the resonant frequency of a stator comprising an elastic body and a piezoelectric element. However, Japanese Patent Application No. 62-203575 created another problem that the supersonic motor generates the audible sound because a driving frequency cannot be followed enough according to a change in load by a driving frequency follow method using the constant monitor voltage. The prior art created a further problem that the driving frequency cannot change according to a change of the motor characteristics due to a change in temperature and load so that the supersonic motor cannot output enough because the supersonic motor keeps the monitor voltage becoming the constant voltage. The prior art created another further problem that when the supersonic motor is locked, the driving frequency deviates from a tolerance, driving the supersonic motor below the resonant frequency, which possibly leads a power amplifier of the driving device to burn. Thus, a merit of the supersonic motor that the motor makes a low noise and is small in size and light in weight could not be put to a practical use efficiently in case that the supersonic motor is employed for a vehicle.

SUMMARY OF THE INVENTION

An object of the invention is to provide a driving method which allows following an optimum driving frequency of a supersonic motor without generating an audible sound in accordance with a change in a temperature and load.

Another object of the invention is to provide a driving method which allows driving a supersonic motor by an output near a locked torque without a driving frequency deviating from a tolerance even when the supersonic motor is locked.

A further object of the invention to provide a driving device which allows following a driving frequency of a supersonic motor precisely and with stability by a simple structure. The structure is safe in that it prevents a power amplifier from burning.

The driving method attaining the objects of the invention comprises driving the supersonic motor by supplying a driving voltage of a higher frequency than a resonant point to a driving piezoelectric element. Decreasing the driving frequency when a waveform distortion does not generate in an output signal of an oscillation detection piezoelectric element provided in an elastic body. Increasing the driving frequency when the waveform distortion generates in the output signal of the oscillation detection piezoelectric element. In accordance with the above structure, when the waveform distortion is not generated in the output signal of the oscillation detection piezoelectric element, the driving frequency is decreased and when the waveform distortion generated, the driving frequency is increased. Accordingly, the driving frequency is usually changed to values in which the waveform distortion generates in the output signal of the oscillation detection piezoelectric element according to a change in circumstances.

Impedance of the supersonic motor has a characteristic illustrated in FIG. 4. The impedance is low at a resonance point and is higher at a frequency near the resonance point. The impedance becomes lower as the frequency becomes higher. A rotor is pressed in an elastic body and is frictionally contacted with it. Therefore, at the resonance point at the frequency near the resonance point, an amplitude of a stator becomes excessively wide and rough audible noises of about 20 KHz is generated and the driving piezoelectric element fails. Accordingly, it is necessary to drive the supersonic motor at a frequency which is a little higher than the above resonance point and frequency and in which the supersonic motor rotates smoothly. From the viewpoint of electrical efficiency, the frequency should desirably, be as near the resonance point as possible. A practicable rotation number and torque of the supersonic motor reaches its maximum in an optimum driving frequency in which no audible noise generates and which is nearest to the resonance.

However, the optimum driving frequency changes according to driving circumstances (see FIG. 5). That is, the optimum driving frequency becomes low with an increase in temperature (FIG. 5 (a)) and the optimum driving frequency becomes high with an increase in load (FIG. 5 (b)). Causes why the driving frequency changes as described above are unknown, but the inventors assume that one of the causes is that an increase in temperature softens a binding layer between the elastic body and the driving piezoelectric element of the stator. The inventors also found that the waveform distortion generated in the output signal of the oscillation detection piezoelectric element just before the audible noise generates and when the supersonic motor is locked.

A method of the invention comprises detecting the output signal generating just before the audible noise is generated by means of the waveform distortion of the output signal generating in the oscillation detection piezoelectric element and actuating the driving piezoelectric element in the optimum driving frequency in which the waveform distortion generates. Therefore, the method allows following the optimum driving frequency automatically when an increase in temperature makes the optimum driving frequency low and also allows following the optimum driving frequency automatically when an increase in load makes the optimum driving frequency high. Further, the method allows detecting generation of the waveform distortion and increasing the driving frequency and a generating torque when the supersonic motor is locked.

The driving device attaining a further objects of the invention comprises waveform distortion detection means detecting the waveform distortion of the output signal generating in the oscillation detection piezoelectric element by a threshold value and frequency follow means decreasing an oscillation frequency of the oscillation means in a first frequency change range when the waveform distortion is not detected by the waveform distortion detection means and increasing the oscillation frequency of the oscillation means in a second frequency change range which is different from the first frequency change range when the waveform distortion is detected by the waveform detection means.

In accordance with the above structure, the frequency follow means decreases the oscillation frequency of the oscillation means in the first frequency change range when the waveform distortion is not detected by the waveform distortion detection means and increases the oscillation frequency of the oscillation means in the second frequency change range which is different from the first frequency change range when the waveform distortion is detected by the waveform detection means. Thus, the driving device allows following the optimum driving frequency of the supersonic motor automatically and stably.

As the wavelength changes even when the supersonic motor is locked, the driving method detects the time when the supersonic motor is locked and increases the driving frequency, so that the driving frequency is does not deviate from a tolerance. The power amplifier is constructed to actuate with the most efficiency near the resonant frequency and to generate the greater loss, burning easily as the driving frequency deviate from the resonant frequency more. However, in the invention the driving frequency is adapted so as not to deviate from the tolerance when the supersonic motor is locked, which prevents the power amplifier from burning.

Other and further objects, features and advantages of the invention will become appear more fully from the following description.

BRIEF DESCRIPTION OF THE DRAWINGS

FIG. 2 is a front view illustrating a disposition of a driving piezoelectric element and an oscillation detection piezoelectric element.

FIG. 3 (a) and FIG. 3 (b) are waveform charts illustrating conditions that a period difference between a first wave and a second wave generates in positive voltages according to generation of a waveform distortion, respectively.

FIG. 11 (a) and FIG. 11 (b) are waveform charts illustrating conditions that the frequency changes according to generation of the waveform distortion of the output signal in a fifth embodiment.

DETAILED DESCRIPTION OF THE PREFERRED EMBODIMENTS

Figure 1:
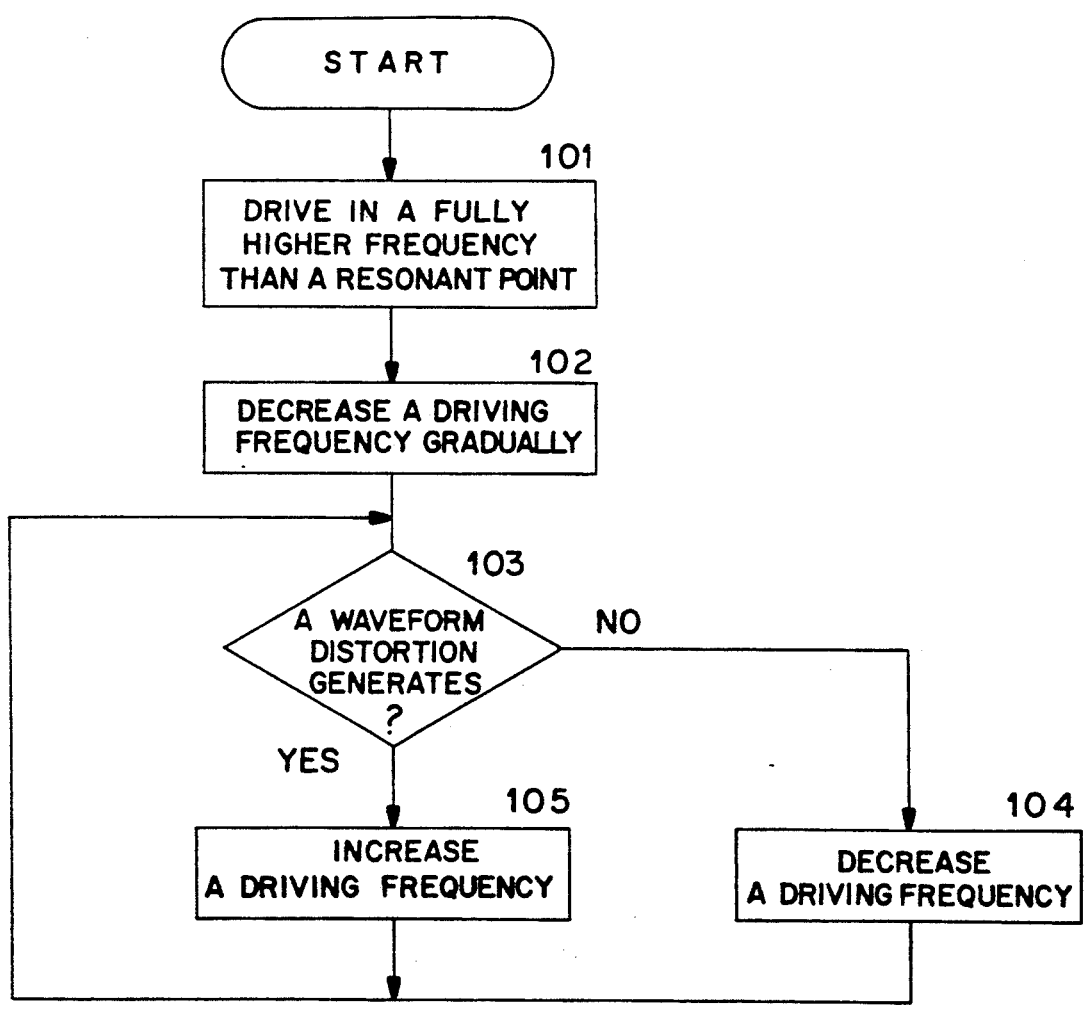
FIG. 1 is a flow chart showing an optimum driving frequency.
Figure 4:
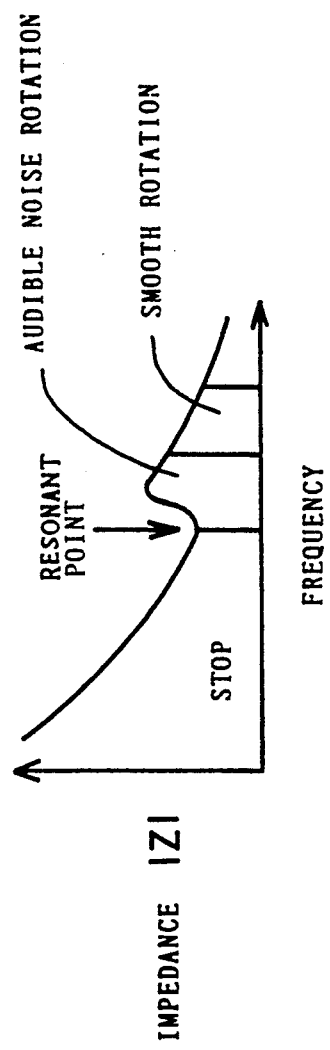
FIG. 4 is a characteristic view illustrating a relationship between a frequency of a supersonic motor and an impedance.
Figure 5:
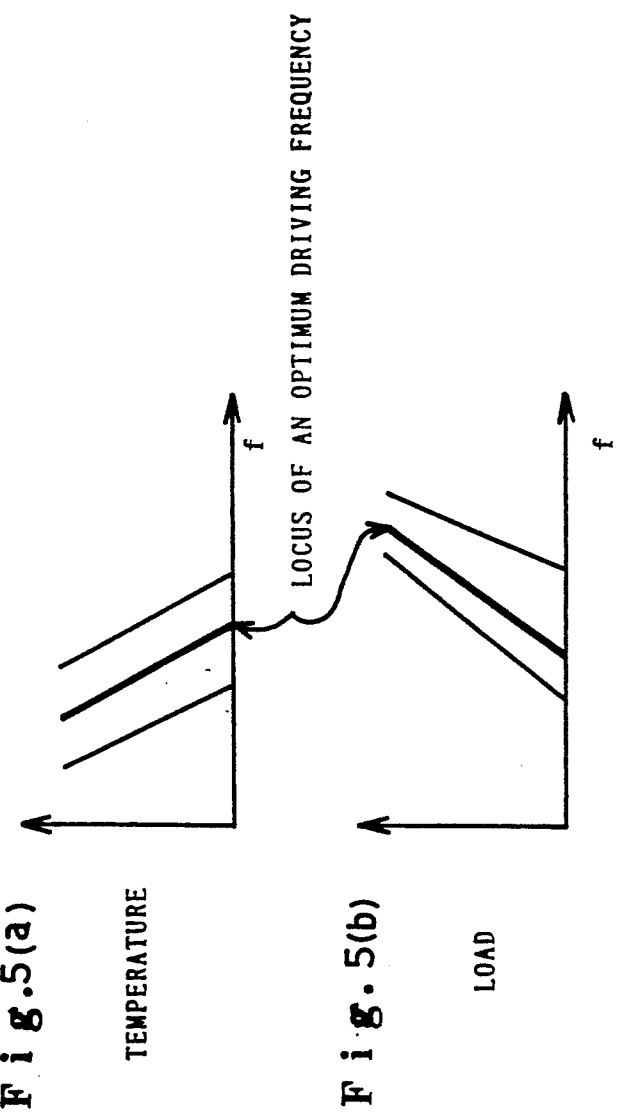
FIG. 5 (a) and FIG. 5 (b), are characteristic views illustrating loci of optimum driving frequencys in relation to a temperature and a load, respectively.

Referring to FIG. 1 to FIG. 3 (a) and FIG. 3 (b), there is shown therein an embodiment of a driving device which follows an optimum driving frequency automatically by means of a method of the present invention.

FIG. 1 illustrates a control flow for following the optimum driving frequency automatically. In step 101 a supersonic motor is driven in a fully higher frequency than a resonant point. In step 102 the driving frequency is decreased gradually. In step 103 a determination is made by a threshold value as to whether a waveform distortion is generated or not. If the waveform distortion is not generated in step 103, in step 4 the driving frequency is decreased more in a first frequency change range. If the waveform distortion is generated in step 103, in step 105 the driving frequency is increased in a second frequency change range which is wider than the first frequency change range.

If the subsequent waveform disturbance is generated, a process is fed back to step 103.

Figure 16:
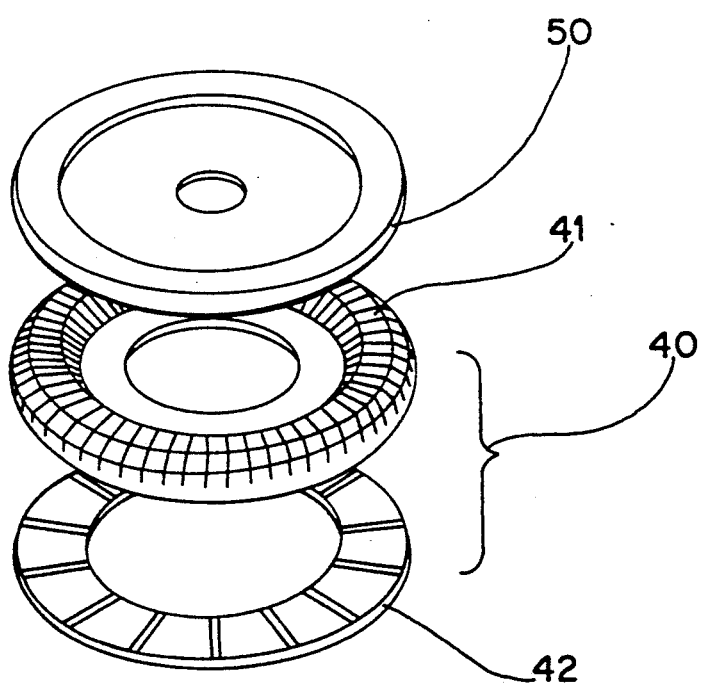
FIG. 16 is a perspective view illustrating a structure of the supersonic motor.

As illustrated in FIG. 16, the supersonic motor has such a structure wherein a piezoelectric element 42 for exciting an elastic body 41 is fixedly provided in the elastic body 41 to from a stator 40 and the elastic body 41 is in frictionally contact with a rotor 50 by using a powerful plate spring (not illustrated).

The piezoelectric element 42 is provided with electrodes and is divided into a driving piezoelectric element and an oscillation detection piezoelectric element 5 described below.

In order to detect the waveform distortion, as illustrated in FIG. 2, the oscillation detection piezoelectric element 2 is provided in a portion which an input voltage generating between the driving piezoelectric element 1a and 1b is not applied to. When the supersonic motor rotates smoothly, a period $T_1$ of a first wave equals to a period $T_2$ of a second wave ($T_1=T_2$) in positive voltage portions of the waveform of the output signal of the oscillation detection piezoelectric body 2, as illustrated in FIG. 3 (a). However, when, or just before, the supersonic motor generates an audible sound, a component causing the audible sound is compounded with the waveform of the output signal of the oscillation detection piezoelectric element 2, thereby generating the waveform distortion, as illustrated in FIG. 3 (b). As a result thereof, the period $T_1$ of a first signal becomes unequal to the period $T_2$ of a second signal. Accordingly, the waveform distortion is detected by comparing the period $T_1$ of the first signal wave with the period $T_2$ of the second signal. The signals T1 and T2 represent a waveform that includes, for example, as a first portion (T1) and a second portion (T2).

Figure 6:
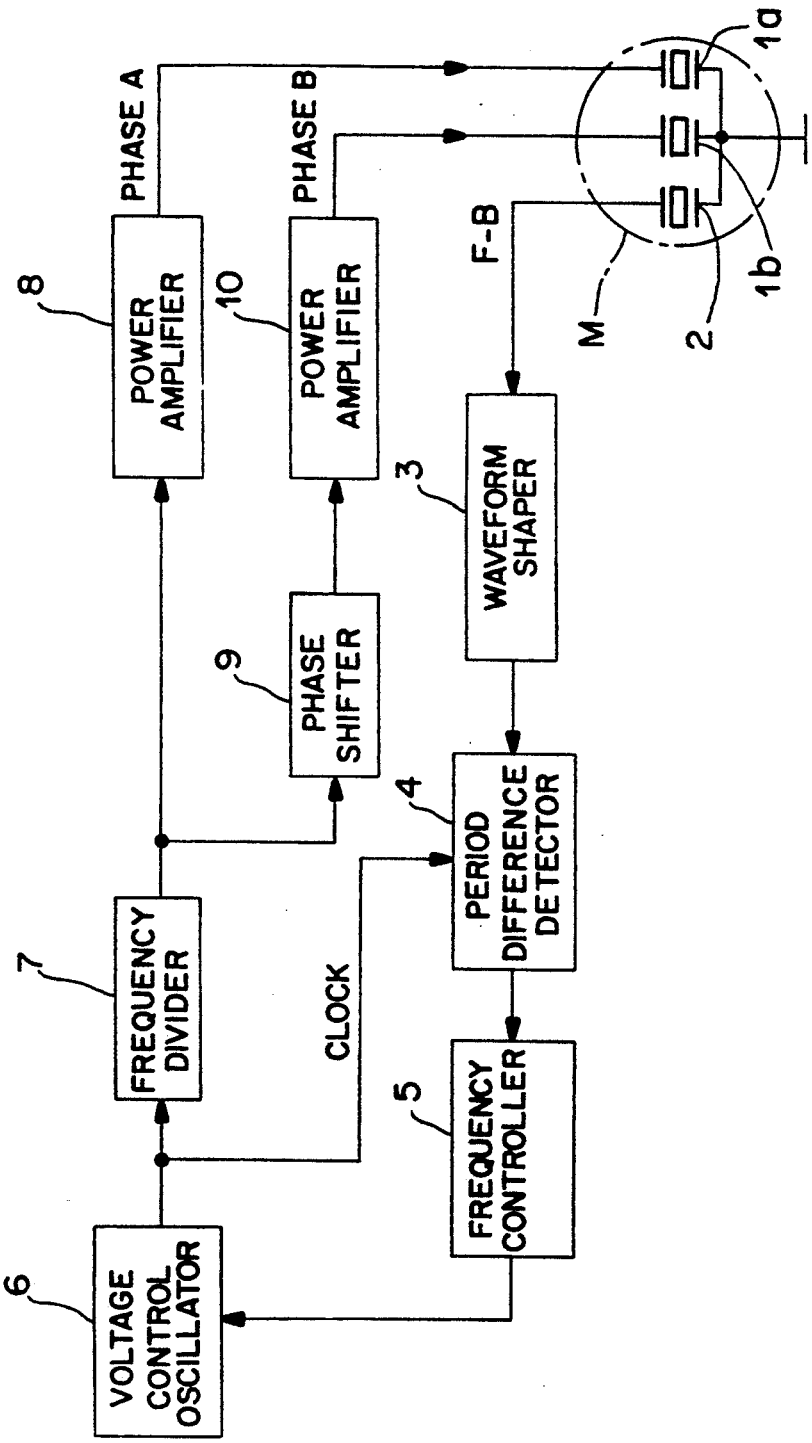
FIG. 6 is a block view of a driving device of a second embodiment.

FIG. 6 illustrates a driving device for carring out a method according to the invention in a second embodiment. The driving device illustrated in FIG. 6 feeds back an output signal generated in an oscillation detection piezoelectric element 2 of a supersonic motor M to a waveform shaper 3. Detecting a period difference of a positive voltage portions of a first and a second wave by a threshold value is made in a period difference detector. There is generated a voltage signal according to the period difference and the voltage signal is sent to a frequency controller 5. The frequency controller 5 is composed of an integrating circuit. The driving device changes an oscillation frequency of a voltage control oscillator 6 by means of the voltage signal generating from the frequency controller 5. The signal generated from the voltage control oscillator 6 is sent to the period difference detector 4 as a clock signal. The signal is frequency-divided in a frequency divider 7, and is power-amplified in a power amplifier 8. It is applied to a driving piezoelectric element 1a of an A phase. Also, the signal generating from the frequency divider 7 is phase-shifted approximately by 90° in a phase shifter 9. The signal is power-amplified in the power amplifier 10, and is applied to a driving piezoelectric element 16 of a B phase.

According to the driving device illustrated in FIG. 6, if a wave distortion is not generate in the output signal of the oscillation detection piezoelectric element 2, the signal generating from the waveform shaper 3 does not include the period difference.

Therefore, the period difference detector 4 does not generate the output signal, so that the output signal generating from the frequency control circuit 5 is decreased. As a result thereof, the oscillation frequency of the voltage control oscillator 6 is decreased.

Accordingly, while the waveform distortion is not generated in the output signal of the oscillation detection piezoelectric element 2, the oscillation frequency of the voltage control oscillator 6 is decreased gradually.

When the waveform distortion generates in the output signal generating from the oscillation detection piezoelectric element 2, the output signal generating from the waveform shaper 3 includes period difference.

Therefore, the output signal generates from the period difference detector 4, so that the output signal generating from the frequency controller 5 is increased. As a result thereof, the oscillation frequency of the voltage control oscillator 6 is increased.

Thus, if the waveform distortion does not generate, the oscillation frequency is decreased and if the waveform distortion generate, the oscillation frequency is increased. Thereby, an optimum control is made for the driving frequency sent to the supersonic motor M in accordance with a change in circumstances such as a temperature and a load. The driving device of the second embodiment has an advantage in that the driving frequency can be automatically followed precisely by a simple circuit structure because the period difference is detected digitally.

Figure 7A:
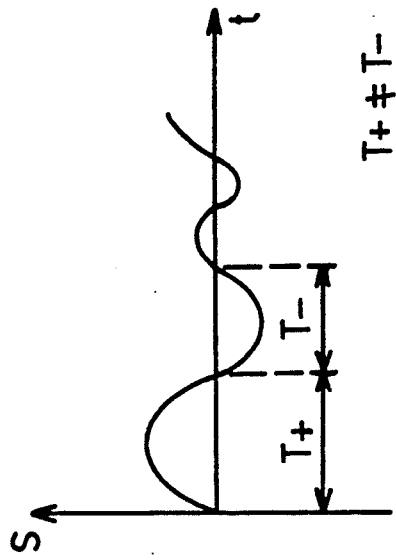
FIG. 7 (a) and FIG. 7 (b) are waveform charts illustrating conditions that the output signal of the oscillation detection piezoelectric element makes a difference between a period showing a positive voltage value and a period showing a negative voltage value.
Figure 7B:
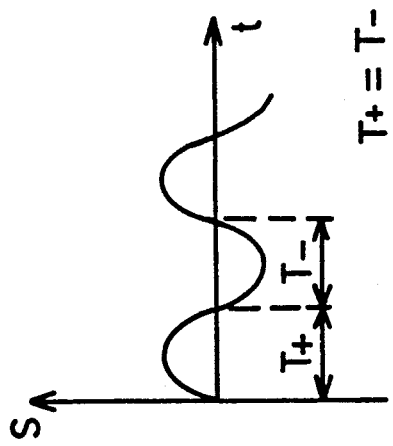

FIG. 7 (a) and FIG. 7 (b) illustrate output signal generating from an oscillation detection piezoelectric element 2, respectively. When a supersonic motor rotates smoothly, the output signal almost makes a sine wave and a period (T+) showing a positive voltage value almost equals to a period (T−) showing a negative voltage value, as illustrated in FIG. 7 (a). In contrast thereto, when a waveform distortion generates (when or just before an audible sound generates), an oscillation component of the audible sound is added to the sine wave, so that the period (T+) showing the positive voltage value becomes unequal to the period (T−) showing the negative voltage value (T+≠T−). In a third embodiment the waveform distortion detected in the period T+ and T− is monitored and a driving frequency is followed automatically by use of an electronic operation control unit (ECU) in accordance with a control flow illustrated in FIG. 1, in the same manner with a first embodiment.

Figure 8:
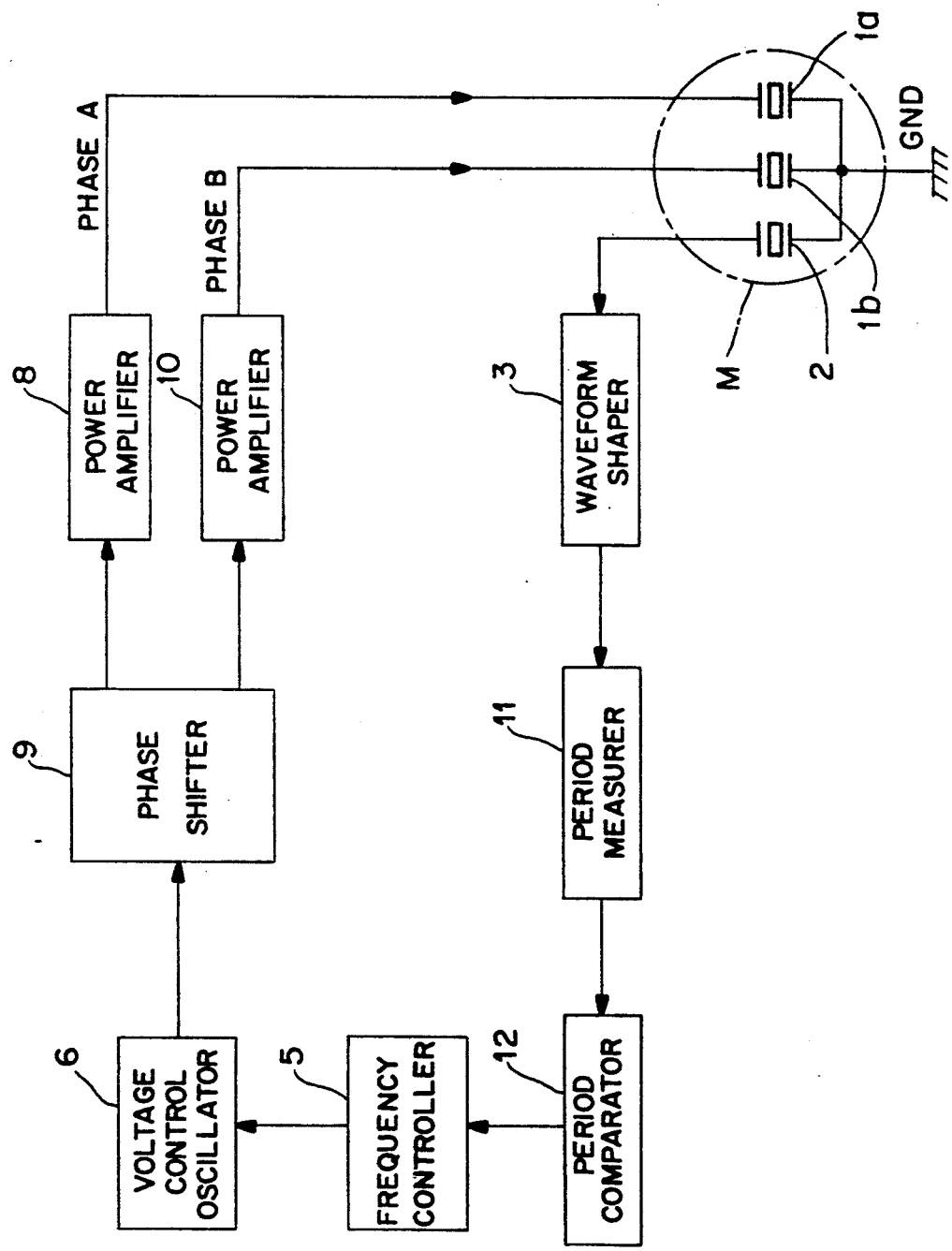
FIG. 8 is a block view illustrating the driving device of a third embodiment.

Also, the driving frequency detected in the period T+ and T− can be followed automatically by a driving device illustrated in FIG. 8.

The driving device illustrated in FIG. 8 feeds back the output signal generating in the oscillation detection piezoelectric element 2 of the supersonic motor M to the waveform shaper 3, in a period measurer 11 which measures the period T+ showing the positive voltage value and the period T− showing the negative voltage value and generates the pulse width signal in accordance with the periods, and sends the pulse width signal to a period comparator 12. The period comparator 12 generates the signal when the period difference generates, and changes the oscillation frequency of the voltage control oscillator 6 by means of the signal generating from the frequency controller 5 composed of an integrating circuit. The signal generating from the voltage control oscillator 6 is phase-shifted by 90° in a phase shifter 9, is power-amplified in the power amplifiers 8 and 10 and is applied to the driving piezoelectric element 1a of an A phase and the driving piezoelectric element 1b of a B phase, respectively.

According to the driving device illustrated in FIG. 8, if a wave distortion is not generated in the output signal of the oscillation detection piezoelectric element 2, a pulse signal generating from the waveform shaper 3 does not include the period difference. Therefore, the period difference generates in a pulse width signal of a period measurer 11, so that the output signal generating from the frequency controller 5 is decreased by a period determination signal generating from the period comparator 12. As a result thereof, the oscillation frequency of the voltage control oscillator 6 is decreased.

Accordingly, while the waveform distortion does not generate in the output signal of the oscillation detection piezoelectric element 2, the oscillation frequency of the voltage control oscillator 6 is decreased gradually. When the waveform distortion generates in the output signal generating from the oscillation detection piezoelectric element 2, the pulse signal generating from the waveform shaper 3 includes the period difference. Therefore, the period determination signal generates from the period comparator 12 in accordance with the pulse width signal of the period measurer 11.

As a result thereof, the oscillation frequency of the voltage control oscillator 6 is increased by the output signal generating from the frequency comparator 12.

Thus, if the waveform distortion does not generate, the oscillation frequency is decreased and if the waveform distortion generates, the oscillation frequency is increased. Thereby, an optimum control is made for the driving frequency sent to the supersonic motor M in accordance with a change in circumstances such as a temperature and a load. A driving circuit of the third embodiment has an advantage in that the driving frequency can be automatically followed precisely by a simple circuit structure because the periods are measured and compared digitally.

Figure 9A:
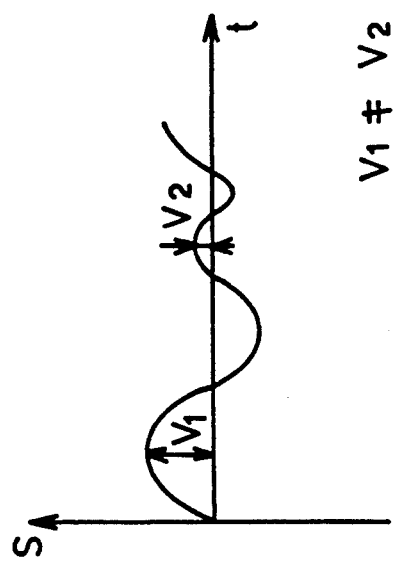
FIG. 9 and FIG. 9 (b) are waveform charts illustrating conditions that the positive voltage of the first wave becomes unequal to the positive voltage of the second wave in respect of the output signal of the oscillation detection piezoelectric element in accordance with generation of the waveform distortion in a fourth embodiment.
Figure 9B:
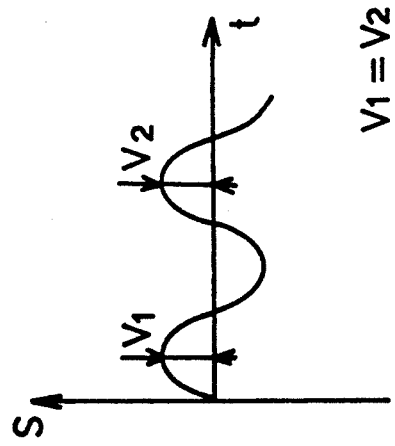

FIG. 9 (a) and FIG. 9 (b) illustrate an output signal generating from an oscillation detection piezoelectric element 2. When a supersonic motor rotates smoothly, the output signal almost makes a sine wave and a positive voltage value $V_1$ of a first wave almost equals to a positive voltage value $V_2$ of a second wave, as illustrated in FIG. 9 (a). In contrast thereto, when a waveform distortion generates (when or just before an audible noise generates), an oscillation component of the audible sound is added to the sine wave, so that the positive voltage value $V_1$ of the first wave becomes unequal to the positive voltage value $V_2$ of the second wave ($V_1 \neq V_2$).

In a fourth embodiment the positive voltage $V_1$ and $V_2$ are monitored and a driving frequency is followed automatically by use of an electronic operation control unit (ECU) in accordance with a control flow illustrated in FIG. 1, in the same manner with a first embodiment.

Figure 10:
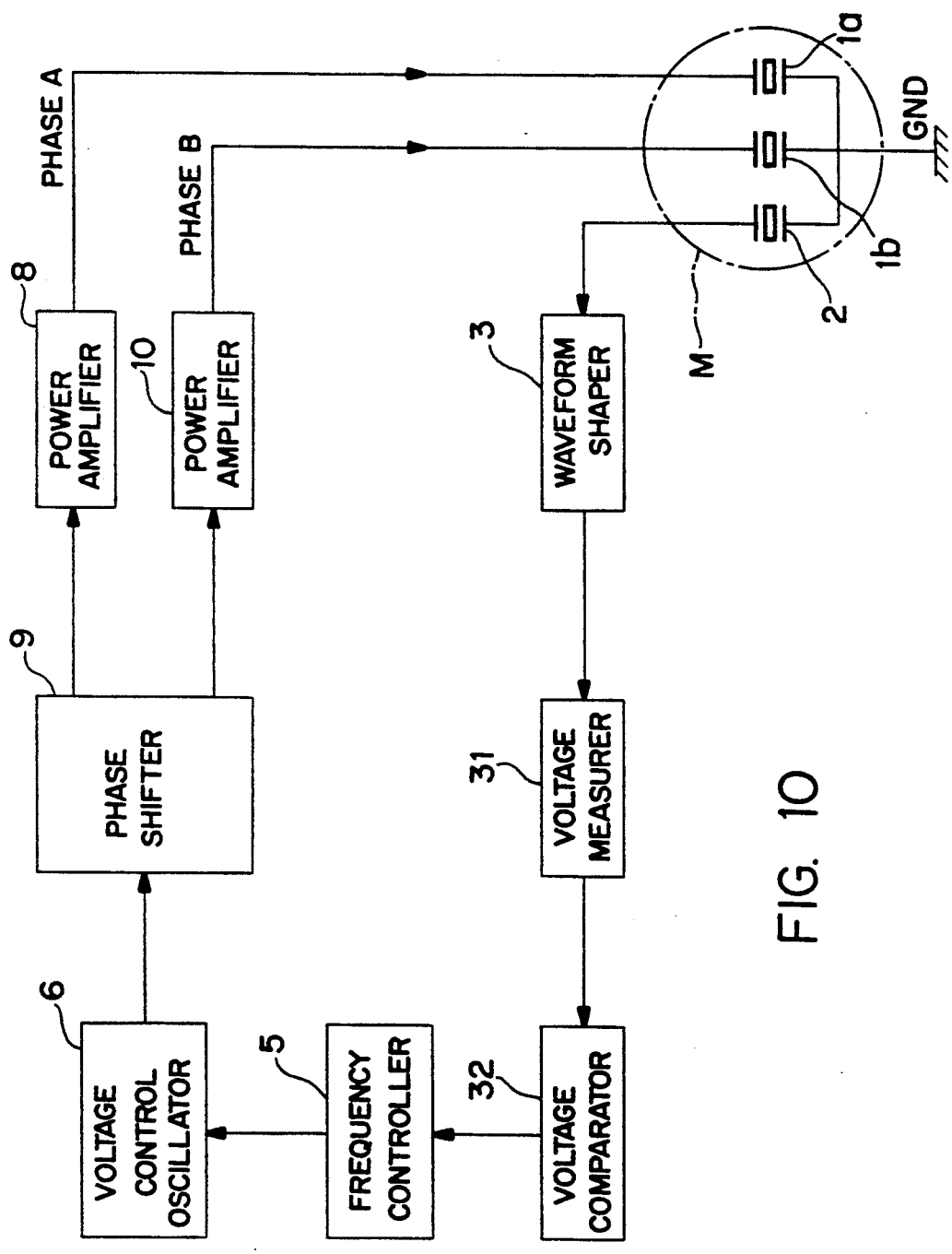
FIG. 10 is a block view illustrating the driving device of a fourth embodiment.

A driving device of a fourth embodiment can be embodied by replacing a period measurer 11 and a period comparator 12 of the driving device illustrated in FIG. 8 with a voltage measurer 31 and a voltage comparator 32 illustrated in FIG. 10.

FIG. 11 (a) and FIG. 11 (b) illustrate an output signal generating from an oscillation detection piezoelectric element 2, respectively. When a supersonic motor rotates smoothly, the output signal almost makes a sine wave and a period (T+) showing a positive voltage value almost equals to a period (T−) showing a negative voltage value, as illustrated in FIG. 11 (a). The positive voltage value is almost equal to the negative voltage value. In contrast thereto, when a waveform distortion generates (when or just before an audible sound generates), an oscillation component of the audible noise is added to the sine wave, so that the period (T+) showing the positive voltage value becomes unequal to the period (T−) showing the negative voltage value (T+≠T−). That is, A frequency showing the positive voltage value becomes unequal to a frequency 48 showing the negative voltage value (f1≠f2).

In a fifth embodiment, a frequency component when a waveform distortion generates is detected and the driving frequency is followed automatically by use of an electronic operation control unit (ECU) in accordance with a control flow illustrated in FIG. 1.

Figure 12:
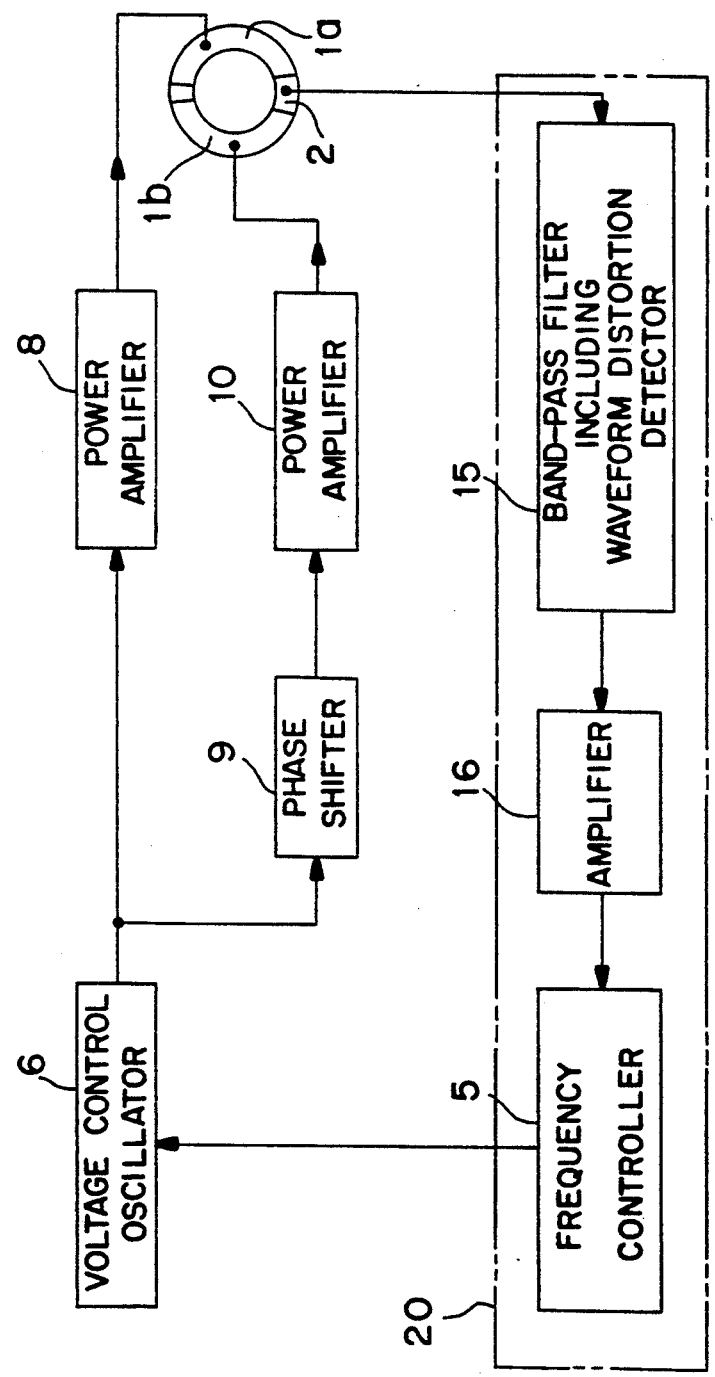
FIG. 12 is a block view illustrating the driving device of a fifth embodiment.
Figure 13:
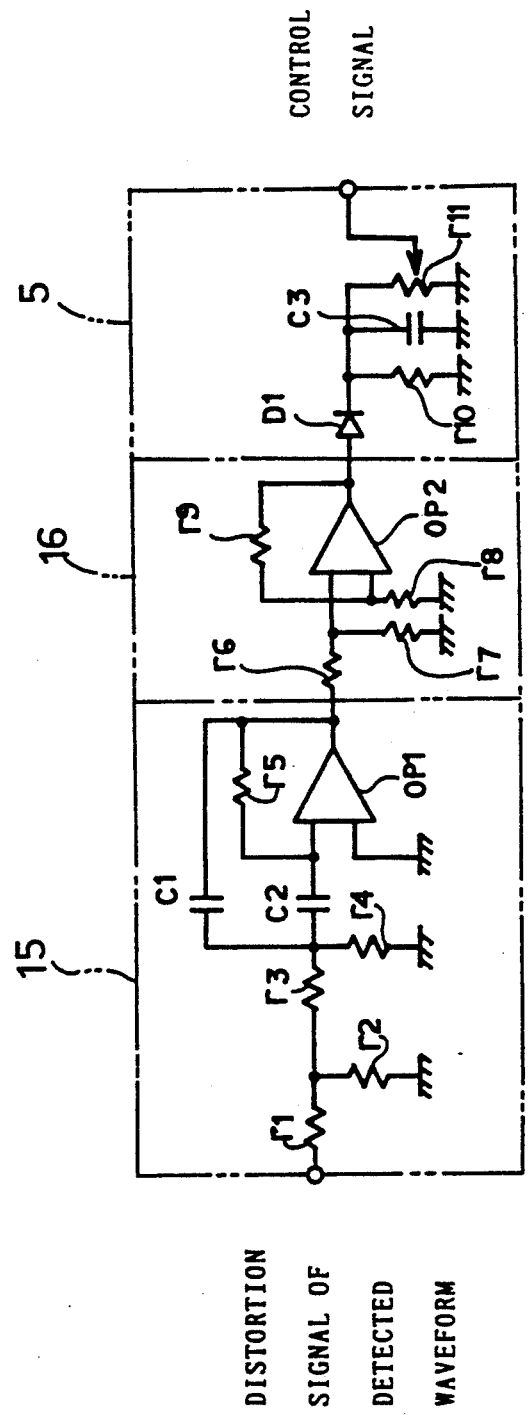
FIG. 13 is a circuit diagram illustrating a frequency follow circuit of the fifth embodiment.

Further, in the fifth embodiment, the frequency component when the waveform distortion generates is detected and the driving frequency is followed automatically by a driving device illustrated in FIGS. 12 and 13. FIG. 12 is a block view illustrating the entire driving device of the fifth embodiment. FIG. 13 is a circuit diagram of a frequency follow circuit 20.

A band-pass filter 15 including the waveform distortion detector is composed of an operation amplifier op 1, condensors $C_1$ and $C_2$ and resistors r1 to r5. An amplifier 16 is composed of an operation amplifier OP2 and resistors r6 to 9. A frequency controller 5 is an integrating circuit, which is composed of a diode $D_1$, resistors 10 and 11, and a condensor $C_3$. The driving device illustrated in FIGS. 12 and 13 feeds back the waveform distortion signal generating in the oscillation detection piezoelectric element 2 of the supersonic motor M to the band-pass filter 15 including the waveform distortion detector and detects the frequency component when the waveform distortion generates by means of the band-pass filter 15. The voltage signal which is based on the frequency component when the waveform distortion generates and which passes the band-pass filter 15 is sent to the amplifier 16.

The voltage signal amplified in the amplifier 16 is integrated in the frequency controller 5 composed of the integrating circuit. The frequency controller 5 generates a control signal, which changes the oscillation frequency of a voltage control oscillator 6.

The signal generating from the voltage control oscillator 6 is power-amplified in the power amplifier 8 and is applied to the driving piezoelectric element 1a of an A phase.

Also, the signal generating from the voltage control oscillator 6 is phase-shifted substantially by 90° in a phase shifter 9, is power-amplified in the power amplifier 10, and is applied to the driving piezoelectric element 1b of a B phase.

According to the driving device illustrated in FIGS. 12 and 13, if the wave distortion does not generate in the output signal of the oscillation detection piezoelectric element 2, the signal does not include the frequency component of the audible sound. Therefore, the output signal does not generate from the band-pass-filter 15 and the amplifier 16 so that the output signal generating from a control signal generator 17 is decreased. As a result thereof, the oscillation frequency of the voltage control oscillator 6 is decreased.

Accordingly, while the waveform distortion does not generate in the output signal of the oscillation detection piezoelectric element 2, the oscillation frequency of the voltage control oscillator 6 is decreased gradually. When the waveform distortion generates in the output signal generating from the oscillation detection piezoelectric element 2, the output signal includes the frequency component of the audible noise. Therefore, the frequency component when the waveform distortion generates is detected in the band-pass filter 15 and the output signal generates from the amplifier 16. As a result thereof, the output signal generating from the control signal generator 17 is increased, so that the oscillation frequency of the voltage control oscillator 6 is increased rapidly.

Thus, if the waveform distortion does not generate, the oscillation frequency is decreased gradually and if the waveform distortion generates, the oscillation frequency is increased rapidly. Thereby, an optimum control is made for the driving frequency sent to the supersonic motor M in accordance with a change in circumstances such as a temperature and a load. The driving device of the fifth embodiment has an advantage in that the driving frequency can be automatically followed precisely by a simple circuit structure because the frequency component when the waveform distortion generates is detected analoguely.

In a sixth embodiment, a wavelength is found by means of a sampling clock, using an output signal of an oscillation detection piezoelectric element and a previous wavelength is compared with a present wavelength in order to detect an optimum driving frequency in all conditions in which a supersonic motor is driven. Just before an output of the supersonic motor reaches its maximum and an audible sound generates, the wavelength of the output signal generating from the oscillation detection piezoelectric element change when a waveform distortion generates. Therefore, if the supersonic motor is driven in the frequency when the waveform distortion generates, the supersonic motor can output with efficiency without generating the audible sound.

Figure 14:
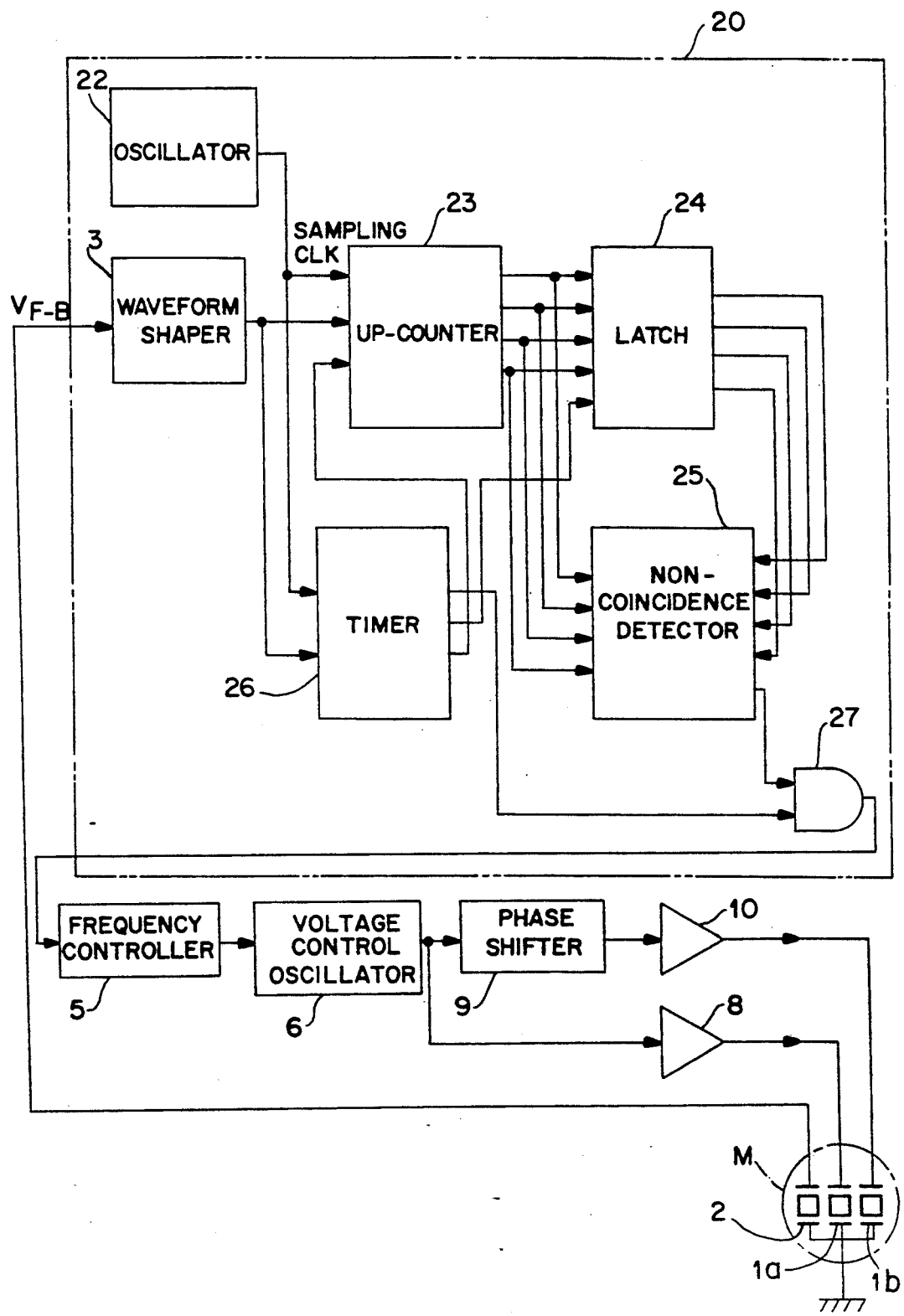
FIG. 14 is a block view illustrating the driving device of a sixth embodiment.
Figure 15:
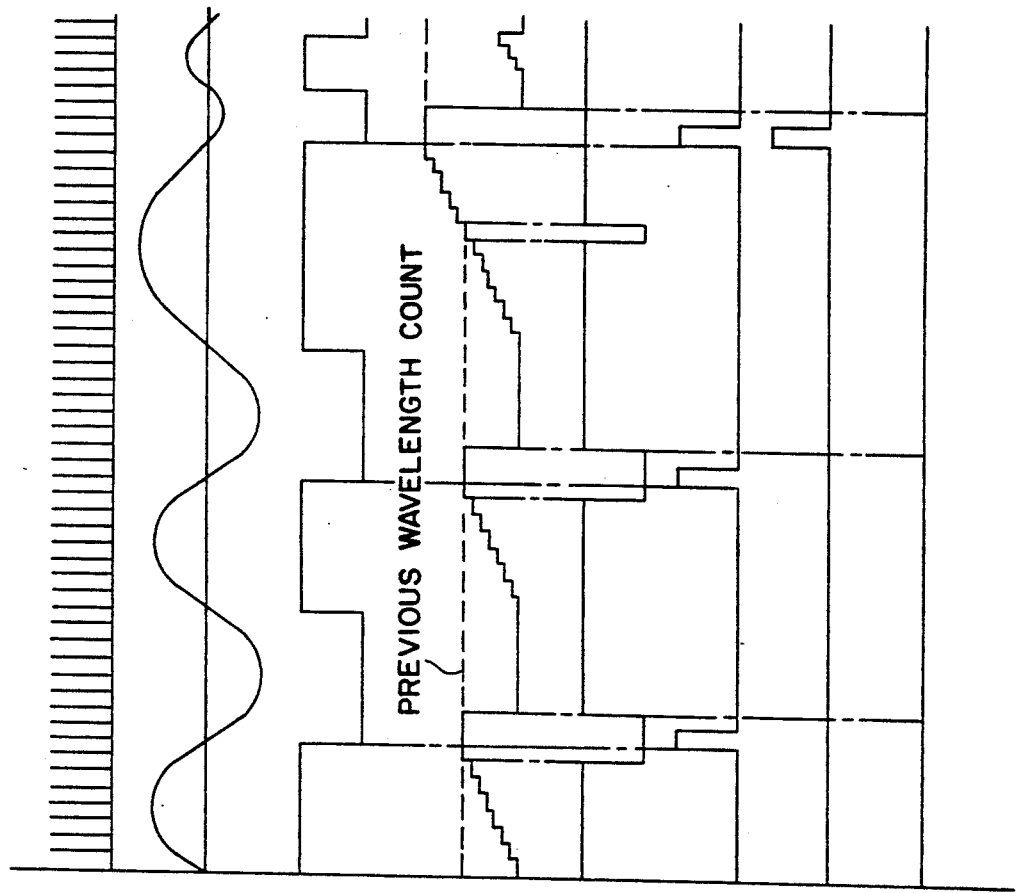
FIG. 15 is a timing chart of the driving device of the sixth embodiment.

Also, the wavelength of the output signal generating from the oscillation detection piezoelectric element changes (that is, the waveform distortion generates) when the supersonic motor is locked. Accordingly, if the driving frequency is increased when the wavelength changes, the driving frequency does not deviate from its optimum range. FIG. 14 illustrates a driving device of the sixth embodiment. FIG. 15 is a timing chart of the driving device. In FIG. 14 a waveform shaper 3 eliminates a noise of the output signal generating from the oscillation detection piezoelectric element 2 and converts the output signal into a digital signal. An oscillator 22 generates the sampling clock. The digital signal generating from the waveform shaper 3 and the sampling clock generating from the oscillator 22 and a timing pulse generating from a timer 26 are inputted to the up-counter 23, which integrates and counts the wavelength of the above digital signal. An up-count signal generating from the up-counter 23 and the timing pulse generating from the timer 26 are inputted to a latch 24, which memorizes a length of the wavelength found in the up-counter 23.

A non-coincidence detector 25 compares a length of a previous wavelength memorized in the latch 24 with that of the present wavelength detected in the up-counter 23 and generates a non-coincidence detection signal. The timer 26 sends the timing pulse to an AND gate 27, the up-counter 23 and the latch 24 and controls actuation of the AND gate 27, the up-counter 23 and the latch 24. The non-coincidence detection signal generating from the non-coincidence detector 25 and the timing pulse generating from the timer 26 are inputted to the AND gate 27, which detects a distortion of the wavelength (a change in the wavelength).

The frequency controller 5 is composed of an integrating circuit and integrates the detection signal generating from the AND gate 27. A voltage control oscillator (V. C. O) 6 changes an oscillation frequency in accordance with an integration value of the detection signal generating from the AND gate 27 and integrated in the frequency controller 5. A frequency follow circuit is composed of the waveform shaper 3, the oscillator 22, the up-counter 23, the latch 24, the non-coincidence detector 25, the timer 26 and the AND gate. The output of the voltage control oscillator 6 is inputted to the phase shifter 9, which generates a phase difference needed to generate a progressive wave in an elastic element of the supersonic motor M. Power amplifiers 8 and 10 are circuits which amplify the output of the voltage control oscillator 6 and the output of the phase shifter 9 to the power needed to drive the supersonic motor M.

The power generating from the power amplifier 8 is inputted to a driving piezoelectric element 1a of the supersonic motor M, while the power generating from the power amplifier 10 is inputted to a driving piezoelectric element 1b of the supersonic motor M.

Referring now to FIGS. 14 and 15, an actuation of the sixth embodiment is explained. In the sixth embodiment the frequency follow circuit 20 compose a feedback loop in order to drive the supersonic motor in an optimum condition. First, a noise is removed from the output signal generating from the oscillation detection piezoelectric element 2 (a feedback signal b illustrated in FIG. 15) in the waveform shaper 3 and the output signal is converted into the digital signal (c) in order to detect the wavelength of the output signal.

Next, the digital signal (c) generating from the waveform shaper 3 and the sampling clock (a) generating from the Oscillator 22 are inputted to the up-counter 23, in which a length of the wavelength of the digital signal is found by count values from a previous rise to a present rise of the digital signal. The digital signal (c) generating from the waveform shaper 3 and the sampling clock (a) generating from the oscillator 22 are also inputted to the timer 26. When the digital signal (c) drops and the count ends, the timing pulses (f, h) generate from the timer 26 to be inputted to the latch 24, the AND gate 27 and the up-counter 23, respectively.

The length of the present wavelength found in the up-counter 23 is memorized in the latch 24 and the length of the previous wavelength memorized ahead in the latch 24 is compared with the length of the present wavelength in the non-coincidence detector 25. If the non-coincidence detector 25 detects a non-coincidence between the lengths of the previous and the present wavelengths, the non-coincidence detector 25 outputs a non-coincidence detection signal (e) to the AND gate 27. The AND gate 27 operates a logical product of the non-coincidence detection signal (e) generating from the non-coincidence detector 25 and the timing pulse (f) generating from the timer 26 and outputs a wavelength change detection signal (g).

When the wavelength change detection signal (g) is inputted to the frequency controller 5, the voltage control oscillator 6 increases the oscillation frequency because the output signal level increases. In the meanwhile, when the wavelength change detection signal (g) is not inputted to the frequency controller 5, the voltage control oscillator 6 decreases the oscillation frequency, so that the driving frequency is followed and is changed to an optimum value.

According to the sixth embodiment, the supersonic motor M can be driven without generating the audible sound by providing the frequency follow circuit 20.

Also, when the supersonic motor is locked, the wavelength changes. Therefore, a torque is increased by increasing the driving frequency according to the wavelength change, so that the supersonic motor can be driven safely by a great output near a locked torque. Further, because the driving frequency increases when the supersonic motor is locked, the supersonic motor is not driven in a frequency below a resonant frequency. As a result thereof, the power amplifier can be prevented from increase in a loss and from burning. In accordance with the sixth embodiment of the invention, there is an advantage in that the supersonic motor is small in size and light in weight and generates a low noise without needing a reduction gear because the supersonic motor is rotated slowly and has a high torque.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for driving a supersonic motor including an elastic body, a stator providing the elastic body, a driving piezoelectric element exciting the elastic body and an oscillation detection piezoelectric element detecting oscillation of the elastic body and a rotor rotated by frictionally contacting with the elastic body, said method comprising:

driving the supersonic motor by supplying a driving voltage of a fully sufficiently higher frequency than a resonant frequency at an ordinary state to the driving piezoelectric element, and outputting a waveform of an output signal of the oscillation detection piezoelectric element having a first specified portion and a second specified portion;

decreasing a driving frequency when a determination is made that the second specified portion is not different from the first specified portion and a waveform distortion does not generate in an output signal of the oscillation detection piezoelectric element provided in the elastic body by comparing the first specified portion and the second specified portion occurring after a first specified portion in an output signal generating in the oscillation detection piezoelectric element, and increasing the driving frequency when the determination is made that the second specified portion is different from the first specified portion and the waveform distortion generates in the output signal of the oscillation detection piezoelectric element by comparing the first specified portion and the second specified portion occurring after a first specified portion in an output signal generated in the oscillation detection piezoelectric element.

2. A driving device for driving a supersonic motor including an elastic body, a stator providing the elastic body, a driving piezoelectric element exciting the elastic body and an oscillation detection piezoelectric element detecting oscillation of the elastic body and a rotor rotated by frictionally contacting the elastic body, said device comprising:

waveform distortion detection means detecting a waveform distortion of an output signal generating in the oscillation detection piezoelectric element by comparing a first specified portion of the waveform and a second specified portion of the waveform occurring after the first specified portion in the output signal by a threshold value and, a frequency follow means decreasing gradually an oscillation frequency of the oscillation means when the waveform distortion is not detected by the waveform distortion detection means and increasing rapidly the oscillation frequency of the oscillation means when the waveform distortion is detected by the waveform detection means.

3. A driving device for driving a supersonic motor including an elastic body, a stator providing the elastic body, a driving piezoelectric element exciting the elastic body and an oscillation detection piezoelectric element detecting oscillation of the elastic body and a rotor rotated by frictionally contacting with the elastic body, said device comprising:

waveform distortion detection means detecting a waveform distortion of an output signal generating in the oscillation detection piezoelectric element by comparing a first specified portion of the waveform and a second specified portion of the waveform occurring after the first specified portion in the output signal by a threshold value, a frequency controller integrating a detection signal generating from the waveform distortion detection means and decreasing an output signal level in a first level change range when the detection signal does not generate from the waveform distortion detection means and increasing the output signal level in a second level change range which is different from the first level change range when the detection signal generates from the waveform distortion detection means, and a voltage control oscillator changing an oscillation frequency according to the output signal level of the frequency controller.

4. The device for driving the supersonic motor as defined in claims 2 or 3, wherein the waveform distortion detection means includes a period difference detector detecting the waveform distortion by comparing a period of a first wave and a period of a second wave in a positive voltage of an output signal generating from the oscillation detection piezoelectric element.

5. The device for driving the supersonic motor as defined in claims 2 or 3, wherein the waveform distortion detection means includes a period measurer measuring a period showing a positive voltage value and a period showing a negative voltage value in the output signal generating from the oscillation detection piezoelectric element and generating a pulse width signal and a period comparator comparing periods of the pulse width signal and generating a period determination signal.

6. The device for driving the supersonic motor as defined in claims 2 or 3, wherein the waveform distortion detection means is determination means which monitors the positive voltage values of the output signal generating from the oscillation detection piezoelectric element and determines that the waveform distortion generates when the positive voltage values becomes unequal to each other.

7. The device for driving the supersonic motor as defined in claims 2 or 3, wherein the waveform distortion detection means includes a band-pass filter detecting an approximately half waveform distortion frequency component of the driving frequency from the output signal generating from the oscillation detection piezoelectric element.

8. The device for driving the supersonic motor as defined in claims 2 or 3, wherein the waveform distortion detection means includes a waveform shaper eliminating a noise from the output signal generating from the oscillation detection piezoelectric element and converting the output signal into a digital signal, an up-counter which the digital signal generating from the waveform shaper is inputted to and detects a wavelength of the digital signal, a latch memorizing the detected wavelength of the digital signal, and a non-coincidence detector comparing the previously detected wavelength and the newly detected wavelength and detecting a change in the wavelength.

* * * * *